United States Patent [19]

Duijkers

[11] 4,228,464

[45] Oct. 14, 1980

[54] PICTURE DISPLAY DEVICE COMPRISING A FIELD DEFLECTION CIRCUIT AND A FIELD BLANKING CIRCUIT

[75] Inventor: Peter A. Duijkers, Nijmegen, Netherlands

[73] Assignee: U.S. Philips Corporation, New York, N.Y.

[21] Appl. No.: 6,607

[22] Filed: Jan. 26, 1979

[30] Foreign Application Priority Data

Feb. 6, 1978 [NL] Netherlands .................. 7801315

[51] Int. Cl.³ .............................................. H04N 3/24
[52] U.S. Cl. ............................................... 358/165
[58] Field of Search ..................................... 358/165

[56] References Cited

U.S. PATENT DOCUMENTS 2,950,346  8/1960  Freedman et al. ............... 358/165
3,763,315  10/1973  Norman ............................ 358/165

OTHER PUBLICATIONS

Dunn et al., "Automatic Beam Blanker for Oscilloscopes", *Electronics*, pp. 94, 95, Sep. 1950.

*Primary Examiner*—Richard Murray
*Attorney, Agent, or Firm*—Thomas A. Briody; William J. Streeter; Edward W. Goodman

[57] ABSTRACT

A picture display device is disclosed having a field deflection circuit and a field blanking circuit. A pulse generator is also included in said device and comprises a gate circuit with OR-function to which is supplied a signal originating from the deflection circuit as well as a signal originating from the field deflection coil. This gate circuit produces a signal which causes the electron beam(s) in the picture display tube to be blanked.

5 Claims, 1 Drawing Figure

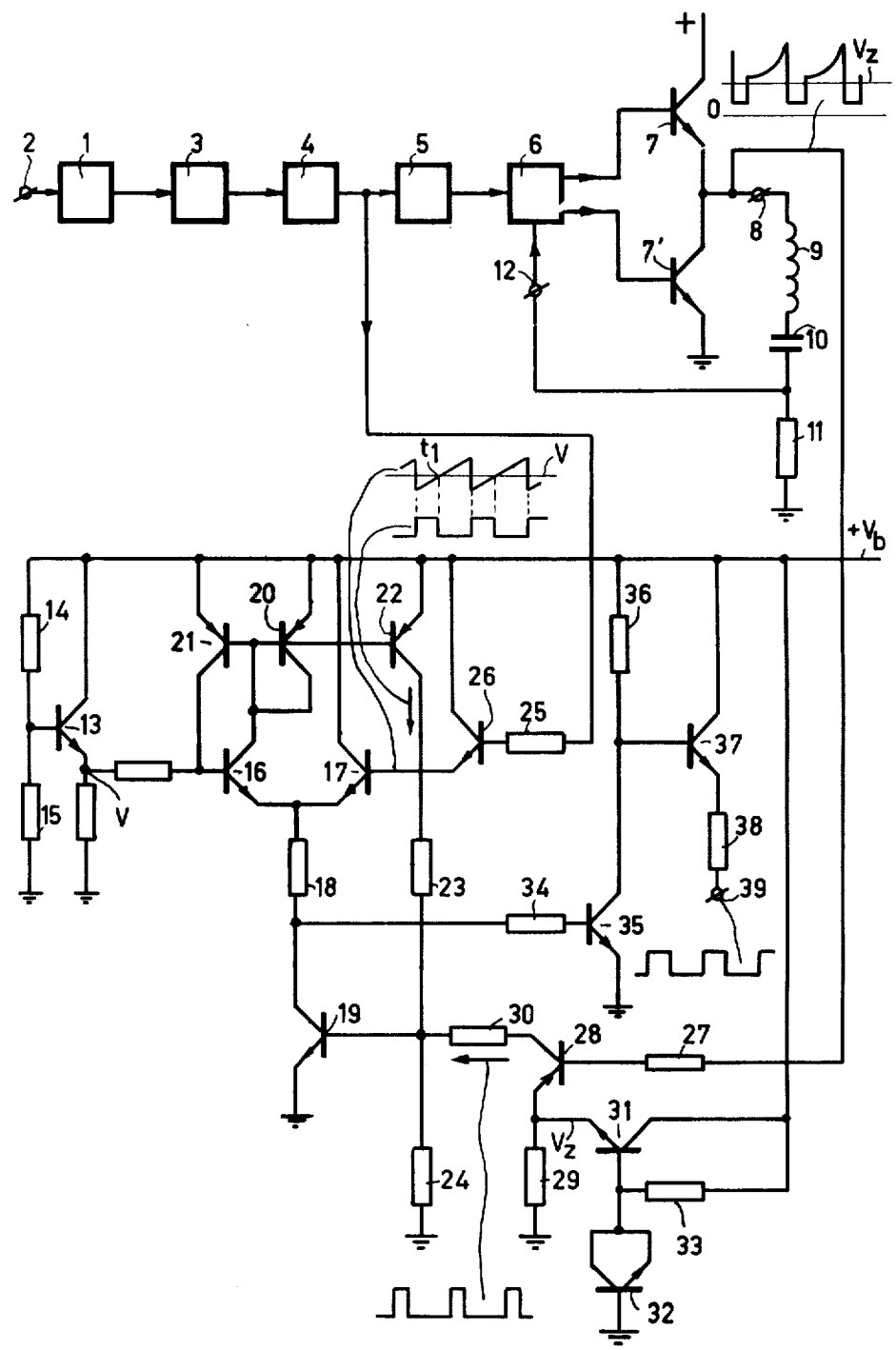

PICTURE DISPLAY DEVICE COMPRISING A FIELD DEFLECTION CIRCUIT AND A FIELD BLANKING CIRCUIT

BACKGROUND OF THE INVENTION

The invention relates to a picture display device comprising a picture display tube, a field deflection circuit for generating a deflection current having a trace and a retrace through a field deflection coil for the vertical deflection of one or more electron beam(s) generated in the picture display tube and a pulse generator for generating a signal for blanking the electron beam(s) at least in the field retrace period.

In such a picture display device, for example a television receiver, a pulse-shaped signal generated by the pulse generator is either applied directly to an electrode of the picture display tube or added to the video signal. This causes the electron beam(s) to be blanked in the field retrace period in which period the display screen of the tube does not light up, so that the lines occurring in this period are not visible.

The retrace period of the field deflection current, that is to say the period in which the deflection current varies rapidly from its maximum value into one direction to its maximum value into the other direction, depends, however, on the inductance value of the deflection coil and, consequently, on the tolerances thereof and on the voltage across the deflection coil and, consequently, any fluctuations thereof. So the retrace period is not known accurately. Mostly the pulse duration of the blanking signal is chosen to have such a long duration that the longest retrace period to be expected is still shorter. The consequence thereof is that not only the lines immediately occurring after the field synchronizing pulse are invisible, as desired, but also useful information at the beginning and/or at the end of the trace period, so at the top and/or at the bottom in the display picture, may be lost.

SUMMARY OF THE INVENTION

It is an object of the invention to ensure that the pulse duration of the blanking signal may not be unnecessarily long so that the least possible useful information is lost, while this duration may not be so short that the display screen lights up before the retrace period has ended as a result of which oblique bright lines, possibly with a brightness modulation, would be visible. To this end the picture display device according to the invention is characterized in that the pulse generator comprises a gate circuit having an OR-function and having means for receiving two input signals, namely a first signal derived from the field deflection circuit and a second signal derived from the field deflection coil, the gate circuit producing the blanking signal for the electron beam(s).

Due to the measure according to the invention, a comparatively short pulse can be chosen without taking spreads in the duration of the retrace period into account. As will appear in the further course of this description the invention also has the advantage that the picture display tube is protected against damage which might be caused due to a disturbance of the field deflection circuit.

DESCRIPTION OF THE DRAWING

The invention will be further explained by way of non-limitative example with reference to the accompanying FIGURE, which shows a section of a television receiver, the field frequency portion of which is shown partly in the form of a block diagram and partly in detailed form.

DESCRIPTION OF THE PREFERRED EMBODIMENT

An input terminal 2 of a field synchronizing circuit 1 is a supplied with field synchronizing pulses which originate from a synchronizing pulse separator (not shown). Circuit 1 synchronizes an oscillator 3. The frequency thereof is the field frequency, that is to say 50 or 60 Hz. The signal of oscillator 3 is converted by means of a sawtooth generator 4 into a sawtooth signal which is applied to a linearity circuit 5. Herein the raster frequency signal is given the required S-shape whereafter it is amplified by a pre-amplifier 6 and thereafter by an output amplifier of which only two power transistors 7 and 7' are shown in the FIGURE. A field deflection coil 9 is connected to an output terminal 8 of the output amplifier, for example the collector of transistor 7', said collector being connected to the emitter of transistor 7. Coil 9 is disposed on the neck of a picture display tube (not shown) for the vertical deflection of the electron beam(s) generated in the display tube and is arranged in series with a d.c. blocking capacitor 10 and a negative feedback resistor 11. The junction of capacitor 10 and resistor 11 is connected to an input terminal 12 of preamplifier 6 for negatively feeding back the voltage present across resistor 11. The remaining circuits of the receiver are of a known type. Also the described synchronizing and deflection circuit is of a known type and is integrated for the major part in a semi-conductor body.

The FIGURE also shows a pulse generator generating a field blanking signal and integrated in the same semiconductor body. A resistor 14 is arranged between the base of an emitter follower transistor 13 of the npn type and the positive terminal of a power supply source $V_b$ and a resistor 15 is arranged between the base and the negative terminal of source $V_b$. This negative terminal is connected to ground. In this manner the voltage at the emitter of transistor 13 is adjusted to a value V during operation.

The pulse generator comprises a differential amplifier having two npn transistors 16 and 17 whose emitters are interconnected and connected to a collector resistor 18 of a further npn transistor 19. The emitter of transistor 19 is connected to ground. The base of transistor 16 is connected via a resistor to the emitter of transistor 13 while the collector of transistor 16 is connected to the collector and to the base of a pnp transistor 20 whose emitter as well as the collector of transistor 17, is connected to the positive terminal of source $V_b$. The base of a pnp transistor 21 as well as the base of a pnp transistor 22 are also connected to the collector of transistor 16, while the emitters of transistors 21 and 22 are connected to the positive terminal of source $V_b$. The collector of transistor 21 is connected to the base of transistor 16. the collector of transistor 22 is connected via two resistors 23 and 24 to ground, the junction of these resistors being connected to the base of transistor 19.

The sawtooth signal from generator 4 is applied via a resistor 25 and an emitter follower transistor 26 to the base of transistor 17. Terminal 8 is connected via a separating resistor 27 to the base of a pnp transistor 28 the emitter of which is connected to ground via a resistor 29, while the collector is connected to the base of transistor 19 via a resistor 30. The emitter of transistor 28 is also connected to the emitter of a npn transistor 31 the collector of which is connected to the positive terminal of source $V_b$, while the base is connected to the emitter and the collector of a npn transistor 32 and to a resistor 33. The base of transistor 32 is connected to ground. The other terminal of resistor 33 is connected to the positive terminal of source $V_b$.

During operation, a field frequency sawtooth voltage, as shown in the FIGURE, is present at the base of transistor 17. It is assumed that the falling edge of the sawtooth is many times steeper than the rising edge. In a time interval at the beginning of the period in which the rising edge occurs, the voltage at the base of transistor 17 is lower than the voltage V prevailing at the emitter of transistor 13. Should a current flow through resistor 18 in this interval, this current would also flow through the emitter of transistor 16, while transistor 17 is cutoff.

Transistors 20 and 21 and transistors 20 and 22 form so-called current mirrors, the collector currents of transistors 20, 21 and 22 being in a substantially fixed ratio to one another. Because the collector current of transistor 21 is many times larger than the base current of transistor 16, which would flow in the absence of transistor 21, transistor 16 will definitely become conductive as soon as the voltage at the base of transistor 17 has become lower than voltage V. As a result thereof the voltage at the collector of transistor 16 decreases rapidly, while the collector current of transistor 22 increases rapidly. This is shown in the FIGURE. This increase is transferred to the base of transistor 19 via resistor 23.

This base is also supplied with information derived from the field output amplifier 7, 7'. The variation of the voltage at terminal 8 versus the time is shown in the FIGURE. This variation is more of less sawtooth-shaped during the trace period and pulse-shaped during the retrace period. As known the duration of the retrace period depends on the inductance value of coil 9 and, consequently, on the tolerances thereof and on the value of the voltage prevailing thereacross during the retrace period, and, consequently, on any fluctuations thereof. In particular, the retrace period is longer for a lower voltage. This voltage may have been derived from a supply voltage, it may also be generated in known manner by a retrace pulse generator.

Transistor 32 operates with resistor 33 as a zener diode so that the voltage at the base of transistor 31, just like the voltage $V_z$ at the emitter of transistor 28, is substantially constant. Transistor 28 is only conductive during the retrace period on the condition that voltage $V_z$ does not exceed the value the voltage at terminal 8 assumes at the end of the retrace period. The collector current of transistor 28 flows in a pulse-shaped manner, as shown. This current pulse has approximately the same pulse duration as the retrace pulse.

The leading edges of the two pulse-shaped signals, namely the signal derived by level V from the sawtooth and the retrace current pulse through the collector of transistor 28 produced in the circuit, substantially coincide. The circuit has been dimensioned so that transistor 19 is kept in the saturated state, after the occurrence of these edges, by at least one of the currents originating from resistors 23 and 30. Consequently, the voltage at the collector of transistor 19 is substantially the ground voltage. If the pulse duration of the retrace pulse exceeds the period of time in which the sawtooth voltage at the base of transistor 17 is lower than voltage V, transistor 19 remains conductive after the instant t at which the sawtooth voltage exceeds the value V, namely until the final instant of the retrace period. However, transistor 16 and, consequently, also transistors 20, 21 and 22 are cutoff between said instants, while transistor 17 conducts. At the final instant of the retrace period transistor 19 is cutoff. This state is maintained until the next leading edge of the two considered pulse-shaped signals.

In the case where the pulse duration of the retrace pulse is shorter than the period of time in which the sawtooth voltage at the base of transistor 17 is lower than voltage V, transistor 19 remains conductive, even after the end of the retrace period, provided the base current thereof, which current then becomes exclusively from resistor 23, is large enough to maintain the saturation state. Transistors 16, 19, 20, 21 and 22 conduct while transistor 17 is cutoff. At the instant $t_1$ at which the base voltage of transistor 17 attains the value V, transistor 16 is cutoff and consequently also transistors 20, 21 and 22. No control signal is then applied to transistor 19, which is also cutoff. This situation is shown in the FIGURE.

From the preceding it appears that the voltage at the collector of transistor 19 has approximately the ground voltage in the period of time in which the longer of the two pulse-shaped signals occurs while this voltage is positive relative to ground in the remaining portion of the period. The duration of one of these signals, that is to say the signal derived from the sawtooth at the base of transistor 17, is determined by the choice of the value of voltage V relative to the sawtooth voltage and, consequently, by the choice of resistors 14 and 15, while one cannot control the duration of the other signal, namely the retrace pulse. The duration of the first-mentioned signal is, namely, constant since the ratio of voltage V to the amplitude of the sawtooth is constant, also when voltage $V_b$ varies.

In the preceding it was assumed that the leading edges of the two signals coincide, so that transistors 16 and 19 are simultaneously made conductive. In practice this is, however, not quite so. The retrace pulse is indeed derived from the same sawtooth signal applied to transistors 26 but delays may be caused in stages 5, 6 and 7, 7' due to slow turn-on and/or turn-off times of semiconductors and slow rise times of, for example, amplifiers. So, as a rule, the leading edge of the retrace pulse will occur a short time after the leading edge of the sawtooth signal. For this reason the collector of transistor 19 is connected via a resistor 34 to the base of a npn transistor 35, a collector resistor 36 of which is connected to the positive terminal of source $V_b$. Before the occurrence of the leading edge of the retrace pulse transistor 19 is cutoff while transistor 35 is conductive. The base current thereof flows through resistors 18 and 34. If the sawtooth voltage at the base of transistor 17 exceeds voltage V transistor 17 conducts, while transistor 16 is cutoff. At the instant at which the falling edge of the sawtooth voltage occurs, transistor 16 is very rapidly made conductive which means that also transistors 20, 21 and 22 conduct and that the collector current of transistor 22 drives transistor 19 into the saturation state. The collector voltage thereof becomes substantially zero so that transistor 35 is cutoff. The occurrence of the leading edge of the retrace pulse does not effect any change in the situation thus obtained.

At the instant at which the last trailing edge of the two considered signals occurs transistor 19 is cutoff, as explained above, so that transistor 35 conducts. At the collector thereof there is a pulse-shaped voltage having a leading edge which substantially coincides with the falling edge of the sawtooth signal, and having a trailing edge which substantially coincides with that of the signal which lasts longest. The pulse-shaped voltage obtained is available via an emitter-follower 37 and an emitter resistor 38 thereof at an output terminal 39 of the semiconductor body. This signal may be applied directly, possibly after having been amplified, to a suitable electrode of the picture display tube for the field frequency blanking of the electron beam(s) generated therein. For the same purpose it is also possible to first add this signal to the video signal in a suitable place in the receiver. If the retrace period exceeds the signal determined by voltage V, the display screen does not light up during this period of time, so that the lines then occurring, which may be brightness modulated caused by an information then transmitted, are not visible. If, on the contrary, the retrace period if shorter than the signal determined by voltage V, the screen does light up but not until after a certain time after the beginning of the trace period, so that a number of lines at the top of the screen is lost. It is obvious that voltage V will be adjusted to such a value that this number of lines will be as low as possible. The advantage obtained is that spreads in the duration of the retrace period, that is to say for example 1.2 to 1.4 ms for a field period of 20 ms, need not be taken into account.

There is yet another advantage: If such a disturbance occurs that the voltage at terminal 8 becomes zero, the picture display tube is protected against any resultant damage. Such a disturbance occurs if transistor 7' becomes defective, namely in such a manner that the collector-emitter path thereof forms a short circuit and/or if transistor 7 is interrupted. Alternatively, it may happen that the control of the output amplifier becomes such that the voltage at terminal 8 becomes zero. Without the measure according to the invention, only one horizontal line of a very high brightness appears on the display screen, which may cause damage to the screen. However, in the circuit of the FIGURE the consequence of such a disturbance is that transistor 28 remains conductive for the period of time the voltage at terminal 8 is zero, which means that also transistor 19 remains conductive for the same period of time and, consequently, that the voltage at terminal 39 is kept at a high level. So the blanking signal is of the same duration as the disturbance and the display screen does not light up.

In the described receiver the retrace pulse occurs simultaneously with the falling edge of the sawtooth generated by generator 4, or a short period of time thereafter. It is, however, conceivable that the control signal for the output amplifier 7 and 7' and the sawtooth signal for deriving the blanking signal are generated in a different manner, namely so that the leading edge of the retrace pulse occurs before the falling edge of the sawtooth. It will be obvious that in this case the described circuit will respond to said leading edge. The leading edge of the generated blanking signal consequently coincides with the leading edge which occurs first, while the trailing edge thereof coincides with the trailing edge occurring last. From this it appears that the described circuit has an OR-function and may, consequently, be replaced by an other circuit having that same function.

What is claimed is:

1. A picture display device comprising a picture display tube, a field deflection circuit for generating a deflection current having a trace and a retrace through a field deflection coil for the vertical deflection of one of more electron beam(s) generated in the picture display tube, and a pulse generator for generating a signal for blanking the electron beam(s) at least in the field retrace period, wherein the pulse generator comprises a gate circuit, the operation of which exhibits an OR-function, having means for receiving two input signals, namely a first input signal derived from the field deflection circuit and a second input signal derived from the field deflection coil, the gate circuit producing the blanking signal for the electron beam(s).

2. A device as claimed in claim 1, wherein said gate circuit comprises a first transistor, the first and the second input signals being applied to the base thereof, and a second transistor the base of which is connected to the collector of the first transistor and arranged such that the second transistor is in the cutoff state when the first transistor is in the conducting state and conducts in the absence of a control signal for the first transistor, the output signal appearing on the collector of the second transistor being the blanking signal.

3. A device as claimed in claim 2, wherein said gate circuit further comprises a third and fourth transistor having the emitters thereof interconnected, a collector resistor connected between the collector of said first transistor and the interconnected emitters of said third and fourth transistors, and a fifth transistor having the base thereof connected to the collector of said third transistor, whereby the first input signal is supplied by the collector of said fifth transistor.

4. A device as claimed in claim 3, wherein a d.c. voltage is applied to the base of the said third transistor while a sawtooth signal is applied to the base of said fourth transistor.

5. A device as claimed in claims 3 or 4 wherein said deflection circuit and said first, second, third, fourth and fifth transistors are incorporated in a semiconductor body.

* * * * *